US012757273B2

(12) United States Patent
Goyal et al.

(10) Patent No.: US 12,757,273 B2
(45) Date of Patent: Oct. 6, 2026

(54) ENHANCEMENT OF NORMAL CALL DOMAIN CONFLICT RESOLUTION DURING EMERGENCY CALL

(71) Applicant: MediaTek Singapore Pte. Ltd., Singapore (SG)

(72) Inventors: Vijay Goyal, Bengaluru (IN); Mithun Sankraman, Bengaluru (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 330 days.

(21) Appl. No.: 18/652,821

(22) Filed: May 2, 2024

(65) Prior Publication Data

US 2024/0381464 A1 Nov. 14, 2024

(30) Foreign Application Priority Data

May 12, 2023 (IN) ............................ 202321033500

(51) Int. Cl.

| | |
|---|---|
| ***H04W 76/15*** | (2018.01) |
| ***H04L 65/1016*** | (2022.01) |
| ***H04L 65/1096*** | (2022.01) |
| ***H04W 76/18*** | (2018.01) |
| ***H04W 76/50*** | (2018.01) |

(52) U.S. Cl.

CPC ......... *H04W 76/15* (2018.02); *H04L 65/1016* (2013.01); *H04L 65/1096* (2013.01); *H04W 76/18* (2018.02); *H04W 76/50* (2018.02)

(58) Field of Classification Search

CPC ..... H04W 76/15; H04W 76/18; H04W 76/50; H04W 28/04; H04W 72/04; H04W 72/042; H04W 88/08; H04W 28/08; H04W 28/084; H04W 36/22; H04W 72/12; H04L 65/1016; H04L 65/1096; H04L 5/0007

See application file for complete search history.

(56) References Cited

U.S. PATENT DOCUMENTS

| | | | | |
|---|---|---|---|---|
| 8,195,234 | B2 * | 6/2012 | Chang | H04M 1/724 455/558 |
| 10,111,274 | B2 * | 10/2018 | Niemi | H04W 76/18 |
| 10,681,604 | B2 * | 6/2020 | Huang | H04W 36/00226 |
| 10,972,953 | B2 * | 4/2021 | Huang | H04W 76/22 |
| 2014/0274006 | A1 * | 9/2014 | Mutya | H04W 4/16 455/416 |
| 2018/0098262 | A1 * | 4/2018 | Chakraborty | H04W 36/0085 |
| 2019/0306732 | A1 * | 10/2019 | Dhanapal | H04W 16/32 |
| 2026/0052446 | A1 * | 2/2026 | Fujishiro | H04W 36/305 |
| 2026/0101301 | A1 * | 4/2026 | Ly | H04W 48/18 |

* cited by examiner

*Primary Examiner* — Phuongchau Ba Nguyen

(74) *Attorney, Agent, or Firm* — Andy M. Han; Han IP PLLC

(57) ABSTRACT

Techniques pertaining to enhancement of normal call domain conflict resolution during a call to an emergency call center (ECC) are described. After a first call having been established between a user equipment (UE) and a wireless network on a domain via a first radio access technology (RAT), the UE attempts to establish a second call between the UE and the wireless network via the first RAT. In response to a failure in attempting to establish the second call via the first RAT, the UE establishes the second call via a second RAT different than the first RAT. In establishing the second call via the second RAT, the UE also transfers the first call on the domain to the second RAT along with establishing of the second call via the second RAT.

14 Claims, 5 Drawing Sheets

ENHANCEMENT OF NORMAL CALL DOMAIN CONFLICT RESOLUTION DURING EMERGENCY CALL

CROSS REFERENCE TO RELATED PATENT APPLICATION(S)

The present disclosure is part of a non-provisional application claiming the priority benefit of Indian patent application No. 202321033500, filed 12 May 2023, the content of which herein being incorporated by reference in its entirety.

TECHNICAL FIELD

The present disclosure is generally related to mobile communications and, more particularly, to enhancement of normal call domain conflict resolution during a call to an emergency call center (ECC).

BACKGROUND

In wireless communications such as mobile communications under the current 3rd Generation Partnership Project (3GPP) specification, a normal call which is on a HOLD state due to a user attempting to make an emergency call may become disconnected due to domain conflict when the emergency call fails on the Internet Protocol (IP) Multimedia Subsystem (IMS) domain with New Radio (NR) as the radio access technology (RAT). This is because the emergency call needs to be redialed on Long-Term Evolution (LTE) as the RAT based on a next-RAT preference. As a result, the user experience is negatively impacted as the user would need to redial and reconnect in order to resume the normal call. Therefore, there is a need for a solution of enhancement of normal call domain conflict resolution during a call to an ECC.

SUMMARY

The following summary is illustrative only and is not intended to be limiting in any way. That is, the following summary is provided to introduce concepts, highlights, benefits, and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions pertaining to enhancement of normal call domain conflict resolution during a call to an ECC.

In one aspect, a method may involve, after a first call having been established between a user equipment (UE) and a wireless network on a domain via a first RAT, attempting to establish a second call between the UE and the wireless network via the first RAT. The method may also involve establishing the second call via a second RAT different than the first RAT responsive to a failure in attempting to establish the second call via the first RAT. In establishing the second call via the second RAT, the method may involve transferring the first call on the domain to the second RAT along with establishing of the second call via the second RAT.

In one aspect, a method may involve establishing a first call having between a UE and a wireless network on an IMS domain via a NR RAT. The method may also involve attempting to establish a second call between the UE and the wireless network via the NR RAT. The method may further involve establishing the second call via an LTE RAT responsive to a failure in attempting to establish the second call via the NR RAT. In establishing the second call, the method may involve transferring the first call on the IMS domain to the LTE RAT along with establishing of the second call via the LTE RAT.

In yet another aspect, an apparatus implementable in a UE may include a transceiver configured to communicate wirelessly and a processor coupled to the transceiver. The processor may, after a first call having been established between the UE and a wireless network on a domain via a first RAT, attempt to establish a second call between the UE and the wireless network via the first RAT. The processor may also establish the second call via a second RAT different than the first RAT responsive to a failure in attempting to establish the second call via the first RAT. In establishing the second call via the second RAT, the processor may transfer the first call on the domain to the second RAT along with establishing of the second call via the second RAT.

It is noteworthy that, although the description provided herein may be in the context of certain radio access technologies, networks, and network topologies such as 5th Generation (5G)/NR/Beyond Fifth-Generation (B5G) mobile communications, the proposed concepts, schemes and any variation(s)/derivative(s) thereof may be implemented in, for and by other types of radio access technologies, networks and network topologies such as, for example and without limitation, 4th Generation (4G)/LTE, LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancement of normal call domain conflict resolution during a call to an ECC. According to the present disclosure, a number of possible solutions may be implemented separately or jointly. That is, although these possible solutions may be described below separately, two or more of these possible solutions may be implemented in one combination or another.

Figure 1:
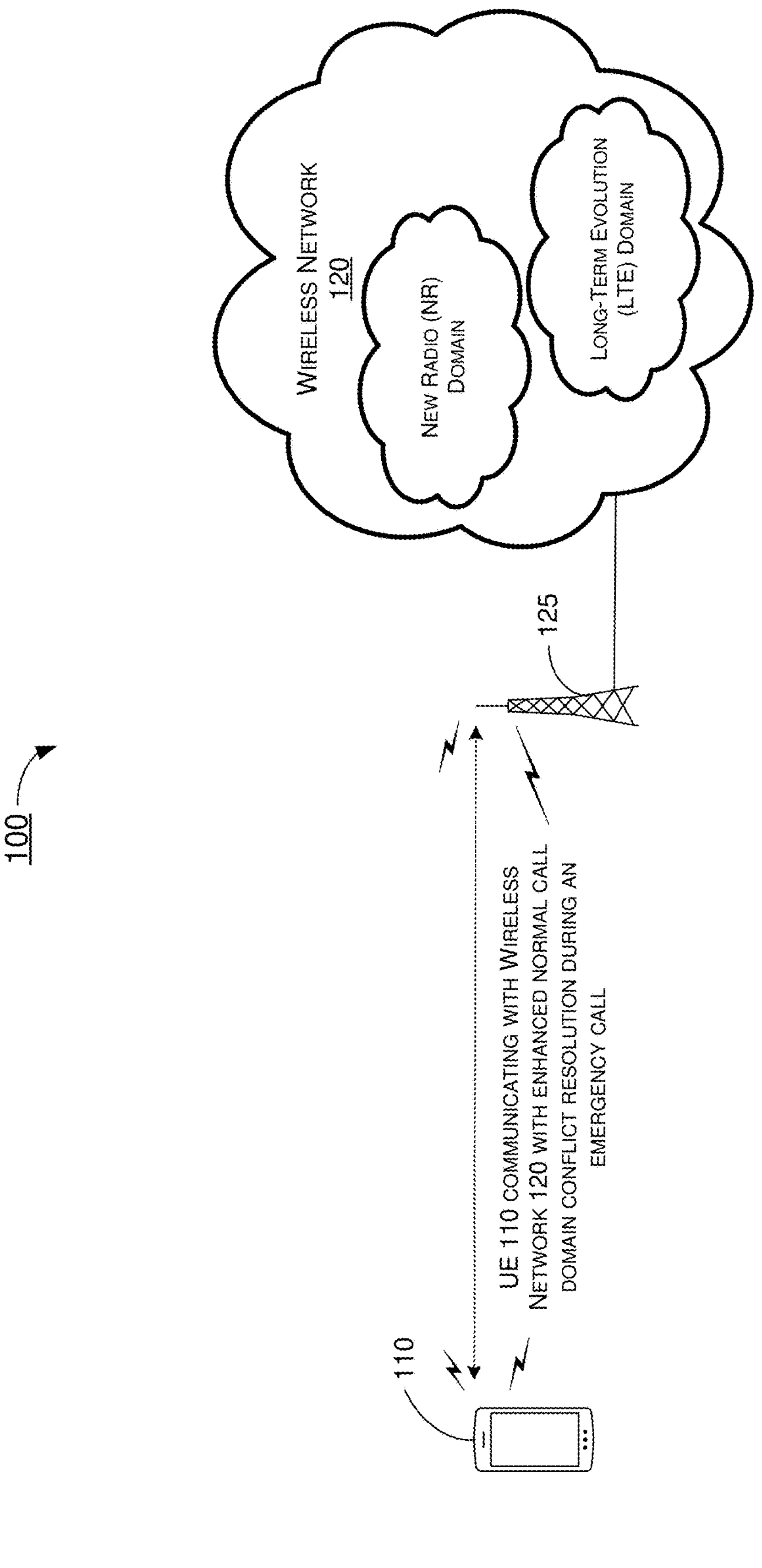
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~ FIG. 5 illustrate examples of implementation of various proposed schemes in network environment 100 in accordance with the present disclosure. The following description of various proposed schemes is provided with reference to FIG. 1~FIG. 5.

Referring to FIG. 1, network environment 100 may involve a UE 110, such as a mobile device or smartphone, in wireless communication with a wireless network 120 as part of a communication network. The wireless network 120 may be a public land mobile network (PLMN) including 5G/NR domain and LTE domain. UE 110 may initially be in wireless communication with wireless network 120 via a base station or network node 125 (e.g., an eNB, gNB or transmit-receive point (TRP)). In network environment 100, UE 110 and the wireless network 120 may implement various schemes pertaining to enhancement of normal call domain conflict resolution during a call to an ECC in accordance with the present disclosure, as described herein.

It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately. Moreover, as used herein, a lower layer may refer to a layer in the 5th Generation Mobility Management (5GMM) protocol stack that is lower than the radio resource control (RRC) layer, such as a packet data convergence protocol (PDCP) layer, a radio control link (RLC) layer, a medium access control (MAC) layer, a physical (PHY) layer, or so forth.

Figure 2:
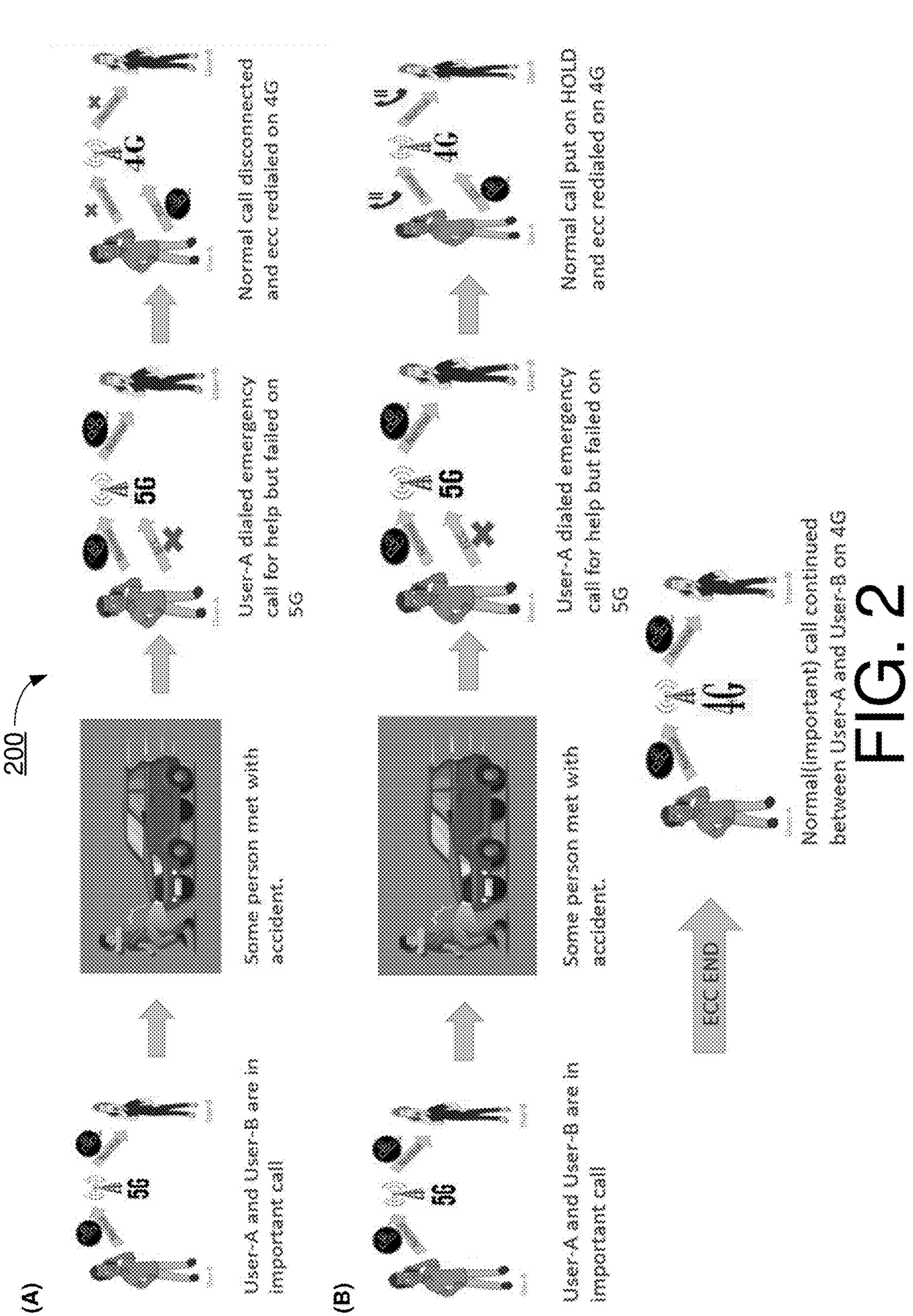
FIG. 2 is a diagram of an example scenario in which various solutions and schemes in accordance with the present disclosure may be implemented.

FIG. 2 illustrates an example scenario 200 in which various proposed schemes in accordance with the present disclosure may be implemented. Referring to part (A) of FIG. 2, initially a first user (User-A) and a second user (User-B) are in a normal or important call via 5G/NR RAT of a wireless network (e.g., wireless network 120). Then, one of the users (e.g., User-A) dials an emergency call to an ECC for help upon witnessing an accident (or for another reason), but the emergency call fails on the 5G/NR RAT (e.g., due to network congestion or some other cause). Consequently, the normal call (which has a relatively lower priority) is disconnected as User-A redials the emergency call (which has a relatively higher priority) to the ECC via 4G/LTE RAT.

Part (B) of FIG. 2 illustrates a scenario in which a proposed scheme in accordance with the present disclosure may be implemented. Under the proposed scheme, the normal call (having a first priority level) on the IMS domain (via 5G/NR RAT) may be placed on hold and transferred along with the emergency call (having a second priority level higher than the first priority level) with LTE being the RAT. Moreover, when the emergency call ends, the normal call may be taken out of the HOLD state to be continued on the 4G/LTE RAT. Referring to part (B) of FIG. 2, initially a first user (User-A) and a second user (User-B) may be in a normal or important call via 5G/NR RAT of a wireless network (e.g., wireless network 120). Then, one of the users (e.g., User-A) may dial an emergency call to an ECC for help upon witnessing an accident (or for another reason), but the emergency call fails on the 5G/NR RAT (e.g., due to network congestion or some other cause). Under the proposed scheme, rather than being disconnected due to domain conflict, the normal call may be placed on hold while the emergency call to the ECC is redialed on the 4G/LTE RAT. Pursuant to an end of the emergency call, the normal (important) call between User-A and User-B may be continued on the 4G/LTE RAT.

In view of the above, a general description of a proposed scheme in accordance with the present disclosure is provided below. Initially, a UE (e.g., UE 110) may be registered on a first domain (e.g., 5G domain) and a user of the UE dialed a normal call which is successful on a given domain (e.g., IMS domain) with NR being the RAT. Then, the user may dial an emergency call, which placed the normal call on HOLD, and the IMS domain with a first RAT (e.g., NR) may be selected for the emergency call to an ECC. However, the emergency call may need to be retried on the IMS domain with a second RAT (e.g., LTE) after the emergency call failed on the first RAT. Under the proposed scheme, a normal scan may be triggered and performed on the second RAT even though the normal call is on HOLD. Based on the scan result being success or failure, a next action may be taken. For instance, in case that the scan result is success, the emergency call may be attempted on the IMS domain with the second RAT and the domain of normal call may be changed from the first domain to the second domain (e.g., LTE domain) internally in the UE. The emergency call may be successfully rendered in the second domain and then disconnected successfully. Then, the normal call may be placed in an UNHOLD state on the second domain for the call to continue until the user ends the call.

Without implementation of the proposed scheme, the normal call would be disconnected due to domain conflict. In contrast, by implementing the proposed scheme, the domain of the normal call may be changed internally along with the emergency call, instead of being disconnected. Advantageously, the issue of call drop/disconnection of the normal call due to domain conflict may be avoided or otherwise alleviated. It is noteworthy that, although examples provided here may be in the context of certain domains (e.g., 5G/NR and 4G/LTE) and certain RATs (e.g., NR and LTE), implementations or the proposed schemes are not limited thereto. That is, the proposed schemes may be implemented in scenarios where domains/RATs are different from those illustrated in the examples. Moreover, although examples provided herein may be in the context of a normal call being placed on HOLD while an emergency call is being attempted, the proposed schemes may be implemented in scenarios where a different type of call (having a first priority level) is placed on HOLD while yet another type of call (having a second priority level higher than the first priority level) is being attempted.

Illustrative Implementations

Figure 3:
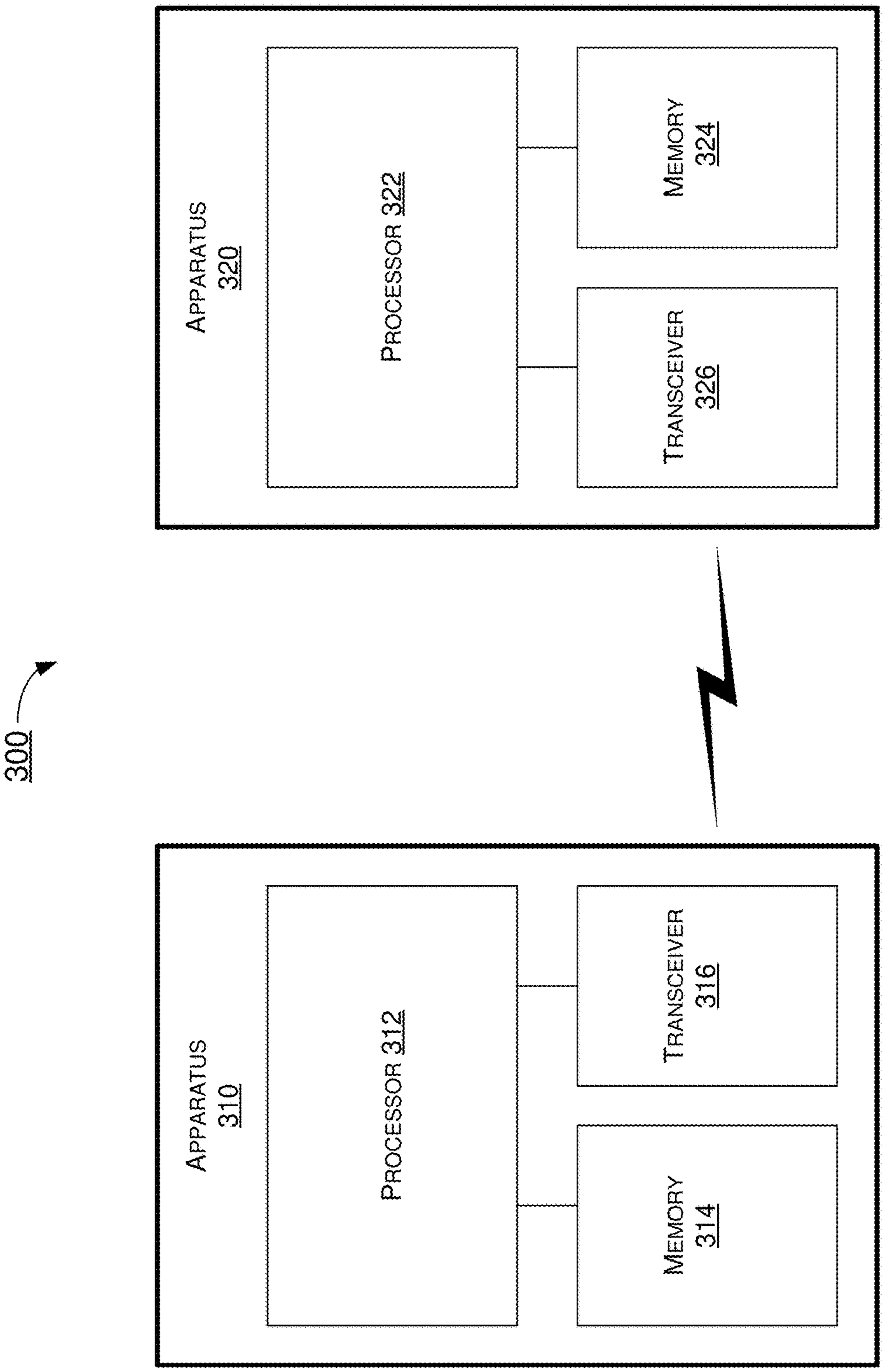
FIG. 3 is a block diagram of an example communication system in accordance with an implementation of the present disclosure.

FIG. 3 illustrates an example communication system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to enhancement of normal call domain conflict resolution during a call to an ECC, including the various schemes described above with respect to various proposed designs, concepts, schemes, systems and methods described above, including network environment 100, as well as processes described below.

Each of apparatus 310 and apparatus 320 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 310 and apparatus 320 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in an LTE, LTE-Advanced or LTE-Advanced Pro network or in a gNB or TRP in a 5G network, an NR network, or an IoT network.

In some implementations, each of apparatus 310 and apparatus 320 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC or RISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged, and configured to perform specific tasks including those pertaining to UE behavior for enhancement of normal call domain conflict resolution during a call to an ECC in accordance with various implementations of the present disclosure.

In some implementations, apparatus 310 may also include a transceiver 316 coupled to processor 312. Transceiver 316 may be capable of wirelessly transmitting and receiving data. In some implementations, transceiver 316 may be capable of wirelessly communicating with different types of wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for multiple-input multiple-output (MIMO) wireless communications. In some implementations, apparatus 320 may also include a transceiver 326 coupled to processor 322. Transceiver 326 may include a transceiver capable of wirelessly transmitting and receiving data. In some implementations, transceiver 326 may be capable of wirelessly communicating with different types of UEs/wireless networks of different RATs. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 310 and apparatus 320 may be a communication entity capable of communicating with each other using various proposed schemes in accordance with the present disclosure. For illustrative purposes and without limitation, a description of capabilities of apparatus 310, as a UE (e.g., UE 110), and apparatus 320, as a network node (e.g., network node 125) of a network (e.g., wireless network 120 as a 5G/NR mobile network), is provided below in the context of example processes 400 and 500.

Illustrative Processes

Figure 4:
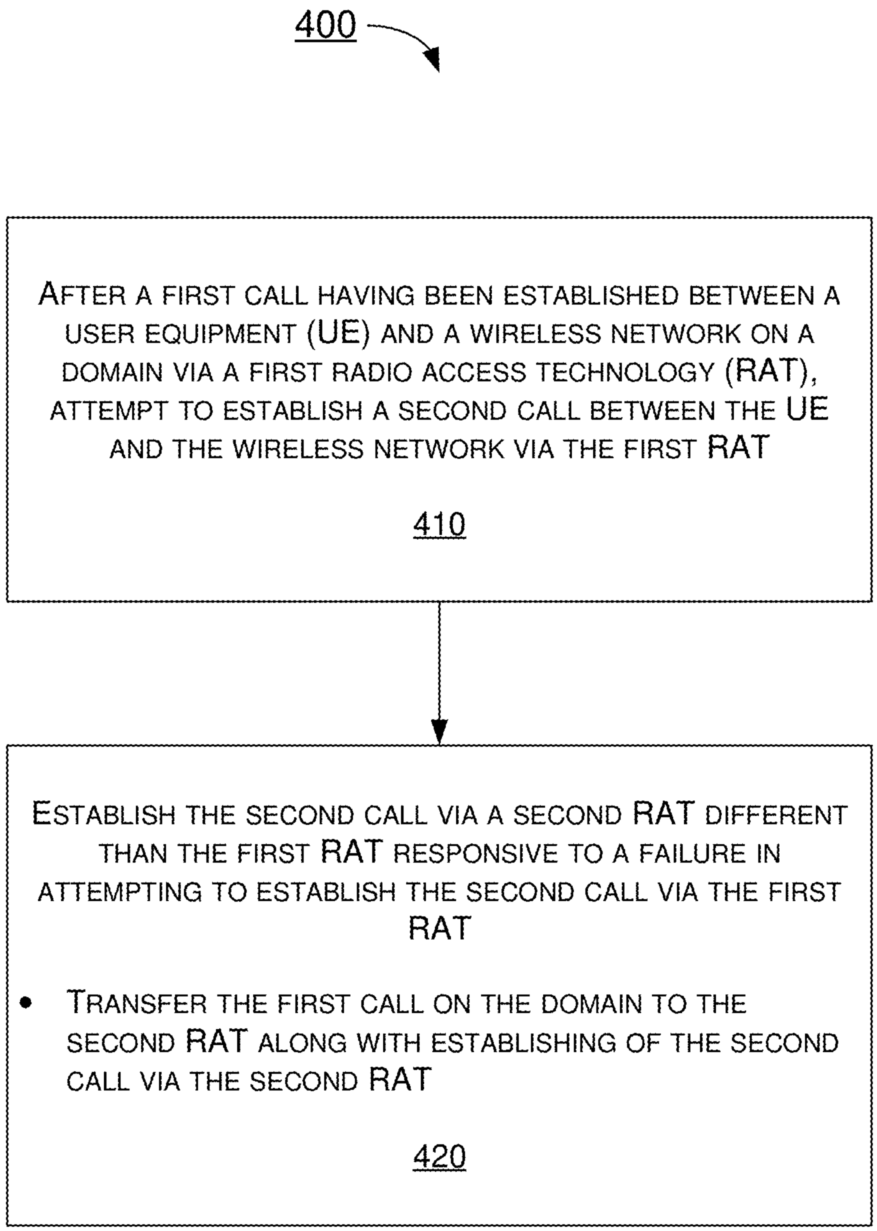
FIG. 4 is a flowchart of a second example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to enhancement of normal call domain conflict resolution during a call to an ECC in accordance with the present disclosure. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively, in a different order. Furthermore, one or more of the blocks/sub-blocks of process 400 may be executed repeatedly or iteratively. Process 400 may be implemented by or in apparatus 310 and apparatus 320 as well as any variations thereof. Solely for illustrative purposes and without limiting the scope, process 400 is described below in the context of apparatus 310 as a UE (e.g., UE 110) and apparatus 320 as a communication entity such as a network node or base station (e.g., network node 125) of a network (e.g., wireless network 120). Process 400 may begin at block 410.

At 410, after a first call having been established between apparatus 310 (e.g., as UE 110) and a wireless network (e.g., via apparatus 320 as network node 125 of wireless network 120) on a domain via a first RAT, process 400 may involve processor 312 attempting, via transceiver 316, to establish a second call between apparatus 310 and the wireless network via the first RAT. Process 400 may proceed from 410 to 420.

At 420, in response to a failure in attempting to establish the second call via the first RAT, process 400 may involve processor 312 establishing, via the transceiver 316, the second call via a second RAT different than the first RAT. In establishing the second call via the second RAT, process 400 may involve processor 312 transferring the first call on the domain to the second RAT along with establishing of the second call via the second RAT.

In some implementations, in establishing the second call, process 400 may further involve processor 312 placing the first call in a hold state.

In some implementations, in transferring the first call, process 400 may involve processor 312 performing certain operations. For instance, process 400 may involve processor 312 triggering a scan on the second RAT while the first call is in the hold state. Moreover, process 400 may involve processor 312 performing a context transfer of the first call to another domain corresponding to the second RAT responsive to a successful result of the scan on the second RAT.

In some implementations, process 400 may involve processor 312 performing additional operations. For instance, process 400 may involve processor 312 taking the first call out of the hold state to continue the first call via the second RAT upon completion of the second call.

In some implementations, the first call may have a first priority level, and the second call may have a second priority level higher than the first priority level. For instance, the first call may include a normal call, and the second call may include an emergency call.

In some implementations, the domain may include an IMS domain. Moreover, the first RAT may include NR, and the second RAT may include LTE.

Figure 5:
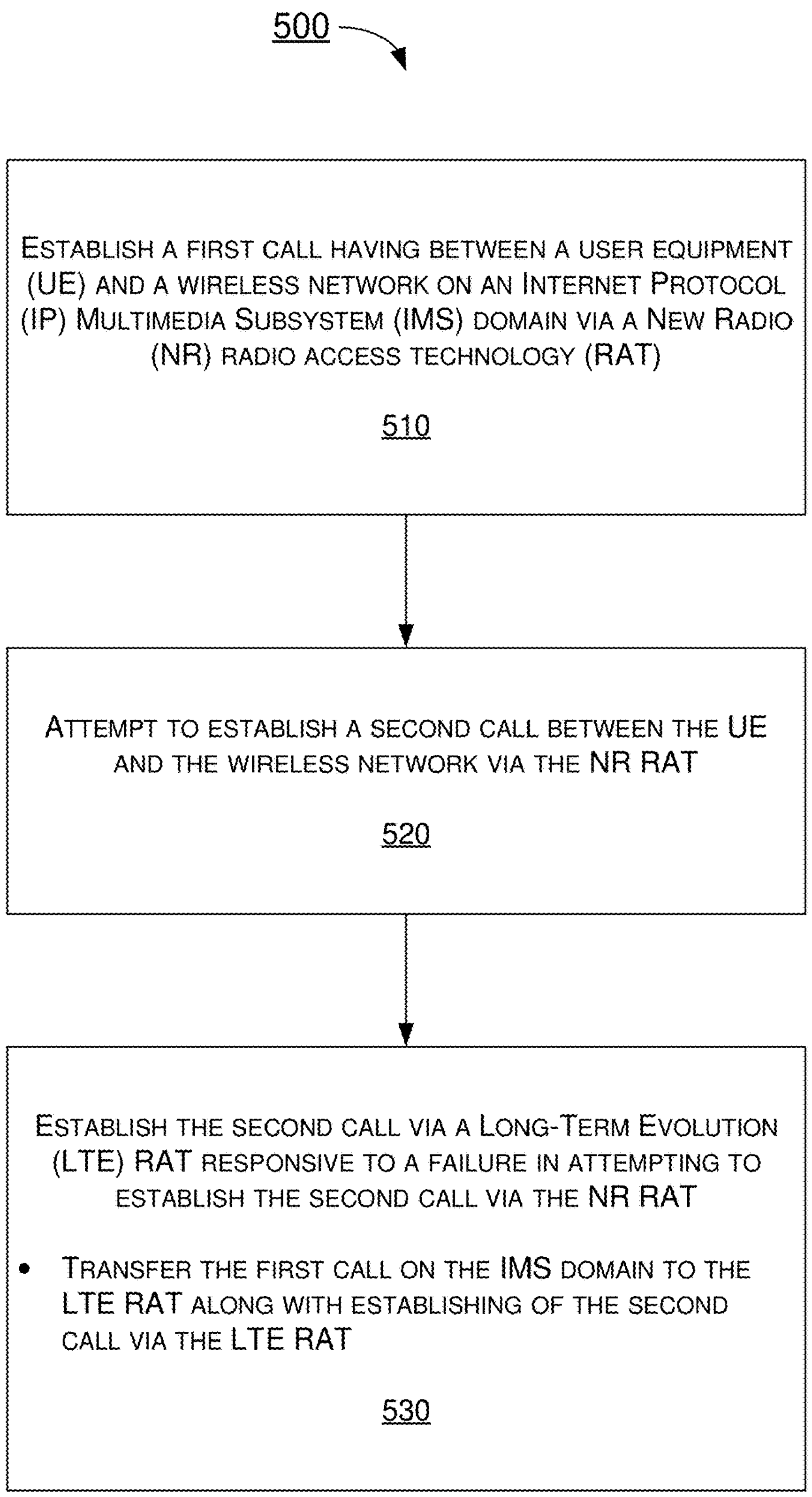
FIG. 5 is a flowchart of a second example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to enhancement of normal call domain conflict resolution during a call to an ECC in accordance with the present disclosure. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively, in a different order. Furthermore, one or more of the blocks/sub-blocks of process 500 may be executed repeatedly or iteratively. Process 500 may be implemented by or in apparatus 310 and apparatus 320 as well as any variations thereof. Solely for illustrative purposes and without limiting the scope, process 500 is described below in the context of apparatus 310 as a UE (e.g., UE 110) and apparatus 320 as a communication entity such as a network node or base station (e.g., network node 125) of a network (e.g., wireless network 120). Process 500 may begin at block 510.

At 510, process 500 may involve processor 312 of apparatus 310 establishing, via transceiver 316, a first call having between apparatus 310 (e.g., as UE 110) and a wireless network (e.g., via apparatus 320 as network node 125 of wireless network 120) on an IMS domain via a NR RAT. Process 500 may proceed from 510 to 520.

At 520, process 500 may involve processor 312 attempting, via transceiver 316, to establish a second call between apparatus 310 and the wireless network via the NR RAT. Process 500 may proceed from 520 to 530.

At 530, process 500 may involve processor 312 establishing, via transceiver 316, the second call via an LTE RAT in response to a failure in attempting to establish the second call via the NR RAT. In establishing the second call, process 500 may involve processor 312 transferring the first call on the IMS domain to the LTE RAT along with establishing of the second call via the LTE RAT.

In some implementations, in establishing the second call, process 500 may further involve processor 312 placing the first call in a hold state.

In some implementations, in transferring the first call, process 500 may involve processor 312 performing certain operations. For instance, process 500 may involve processor 312 triggering a scan on the LTE RAT while the first call is in the hold state. Moreover, process 500 may involve processor 312 performing a context transfer of the first call to an LTE domain corresponding to the LTE RAT responsive to a successful result of the scan on the LTE RAT.

In some implementations, process 500 may involve processor 312 performing additional operations. For instance, process 500 may involve processor 312 taking the first call out of the hold state to continue the first call via the LTE RAT upon completion of the second call.

In some implementations, the first call may have a first priority level, and the second call may have a second priority level higher than the first priority level. For instance, the first call may include a normal call, and the second call may include an emergency call.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

after a first call having been established between a user equipment (UE) and a wireless network on a domain via a first radio access technology (RAT), attempting to establish a second call between the UE and the wireless network via the first RAT; and establishing the second call via a second RAT different than the first RAT responsive to a failure in attempting to establish the second call via the first RAT, wherein the establishing of the second call via the second RAT comprises transferring the first call on the domain to the second RAT along with establishing of the second call via the second RAT, wherein the establishing of the second call further comprises placing the first call in a hold state, and wherein the transferring of the first call comprises:

triggering a scan on the second RAT while the first call is in the hold state; and performing a context transfer of the first call to another domain corresponding to the second RAT responsive to a successful result of the scan on the second RAT.

2. The method of claim 1, further comprising:

taking the first call out of the hold state to continue the first call via the second RAT upon completion of the second call.

3. The method of claim 1, wherein the first call has a first priority level, and wherein the second call has a second priority level higher than the first priority level.

4. The method of claim 1, wherein the first call comprises a normal call, and wherein the second call comprises an emergency call.

5. The method of claim 1, wherein the domain comprises an Internet Protocol (IP) Multimedia Subsystem (IMS) domain, wherein the first RAT comprises New Radio (NR), and wherein the second RAT comprises Long-Term Evolution (LTE).

6. A method, comprising:

establishing a first call having between a user equipment (UE) and a wireless network on an Internet Protocol (IP) Multimedia Subsystem (IMS) domain via a New Radio (NR) radio access technology (RAT);

attempting to establish a second call between the UE and the wireless network via the NR RAT; and establishing the second call via a Long-Term Evolution (LTE) RAT responsive to a failure in attempting to establish the second call via the NR RAT, wherein the establishing of the second call comprises transferring the first call on the IMS domain to the LTE RAT along with establishing of the second call via the LTE RAT, wherein the establishing of the second call further comprises placing the first call in a hold state, and wherein the transferring of the first call comprises;

triggering a scan on the LTE RAT while the first call is in the hold state; and performing a context transfer of the first call to an LTE domain corresponding to the LTE RAT responsive to a successful result of the scan on the LTE RAT.

7. The method of claim 6, further comprising:

taking the first call out of the hold state to continue the first call via the LTE RAT upon completion of the second call.

8. The method of claim 6, wherein the first call has a first priority level, and wherein the second call has a second priority level higher than the first priority level.

9. The method of claim 6, wherein the first call comprises a normal call, and wherein the second call comprises an emergency call.

10. An apparatus implementable in a user equipment (UE), comprising:

a transceiver configured to communicate wirelessly; and a processor coupled to the transceiver and configured to perform operations, via the transceiver, comprising:

after a first call having been established between the UE and a wireless network on a domain via a first radio access technology (RAT), attempting to establish a second call between the UE and the wireless network via the first RAT; and establishing the second call via a second RAT different than the first RAT responsive to a failure in attempting to establish the second call via the first RAT, wherein the establishing of the second call via the second RAT comprises transferring the first call on the domain to the second RAT along with establishing of the second call via the second RAT, wherein the establishing of the second call further comprises placing the first call in a hold state, and wherein the transferring of the first call comprises:

triggering a scan on the second RAT while the first call is in the hold state; and performing a context transfer of the first call to another domain corresponding to the second RAT responsive to a successful result of the scan on the second RAT.

11. The apparatus of claim 10, wherein the processor is further configured to perform operations comprising:

taking the first call out of the hold state to continue the first call via the second RAT upon completion of the second call.

12. The apparatus of claim 10, wherein the first call has a first priority level, and wherein the second call has a second priority level higher than the first priority level.

13. The apparatus of claim 10, wherein the first call comprises a normal call, and wherein the second call comprises an emergency call.

14. The apparatus of claim 10, wherein the domain comprises an Internet Protocol (IP) Multimedia Subsystem (IMS) domain, wherein the first RAT comprises New Radio (NR), and wherein the second RAT comprises Long-Term Evolution (LTE).

* * * * *